Nov. 16, 1943.    H. W. HEM    2,334,326
WEIGHING SCALE
Filed June 4, 1940    4 Sheets-Sheet 2
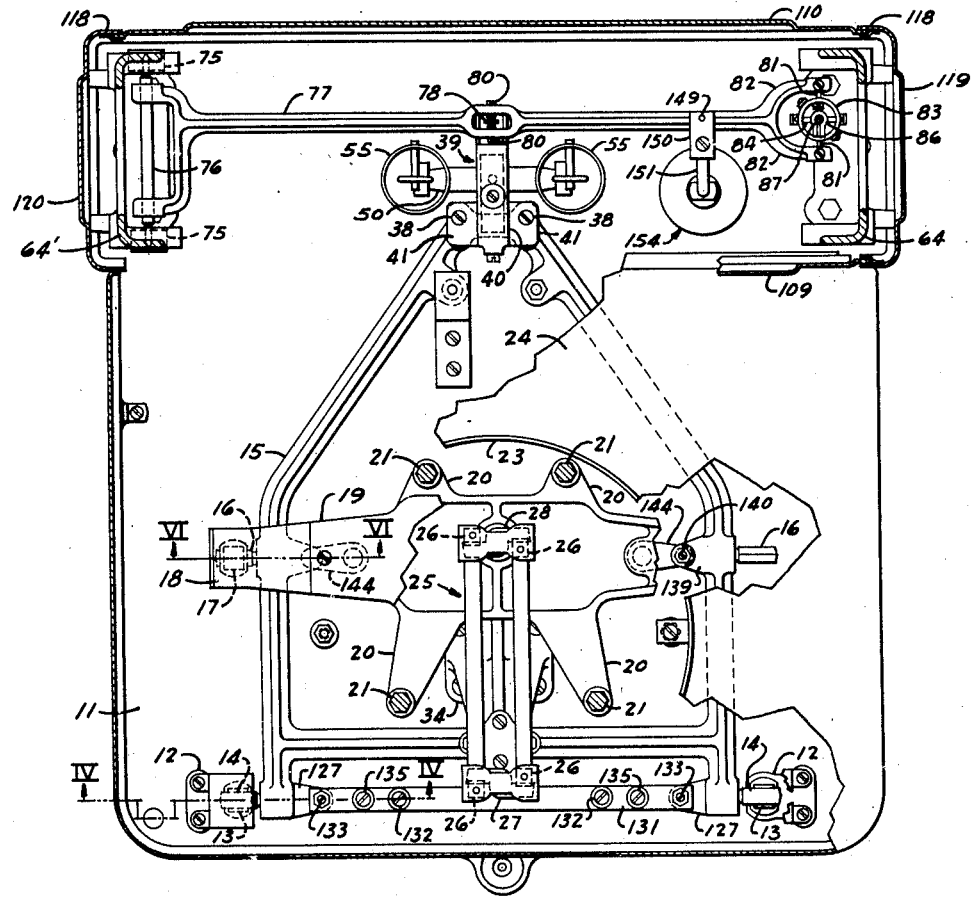
Fig. III
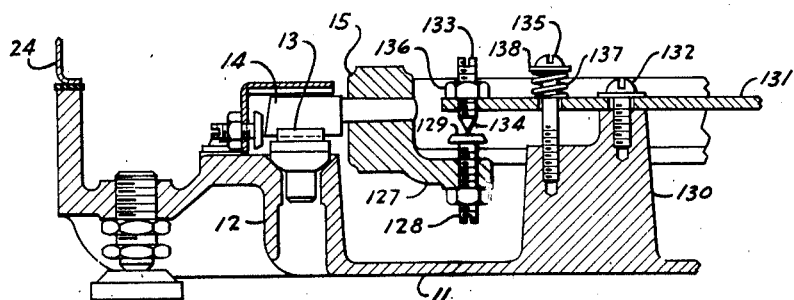
Fig. IV
Halvor W. Hem
INVENTOR
BY Marshall & Marshall
ATTORNEYS Nov. 16, 1943.        H. W. HEM        2,334,326
WEIGHING SCALE
Filed June 4, 1940        4 Sheets-Sheet 3
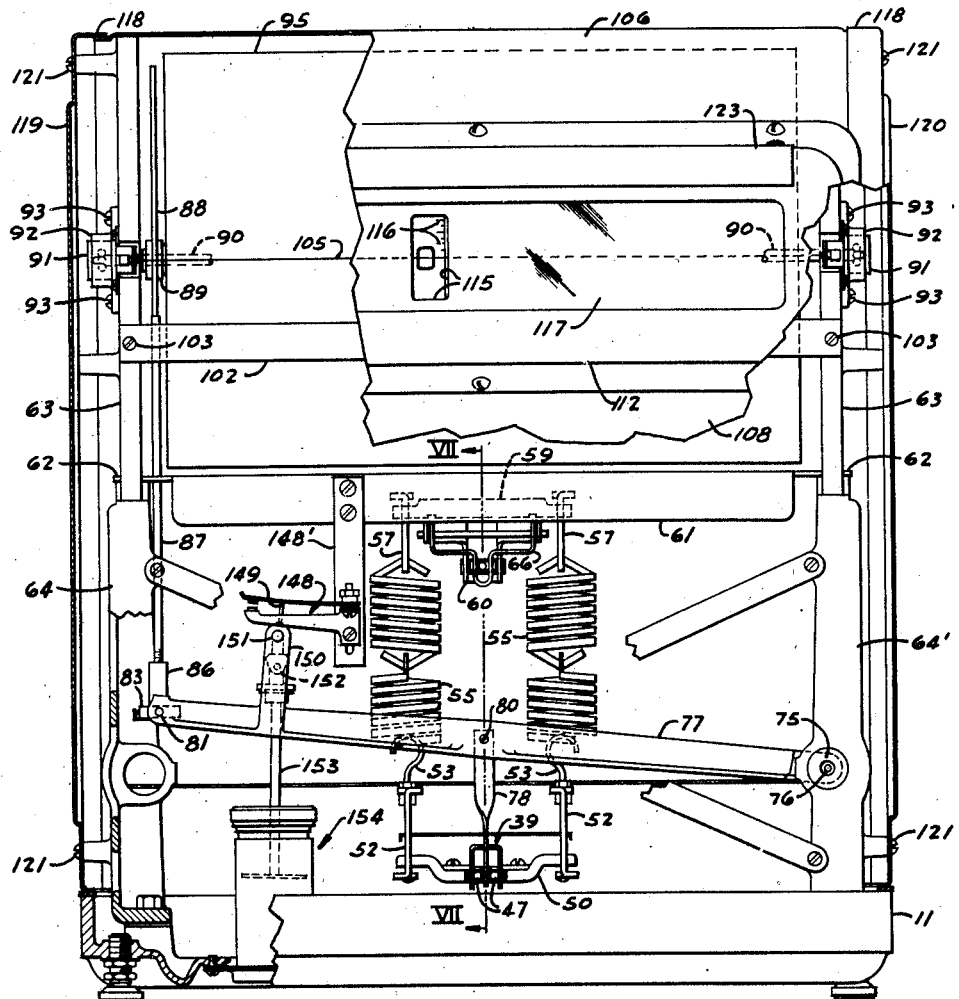
Fig. V
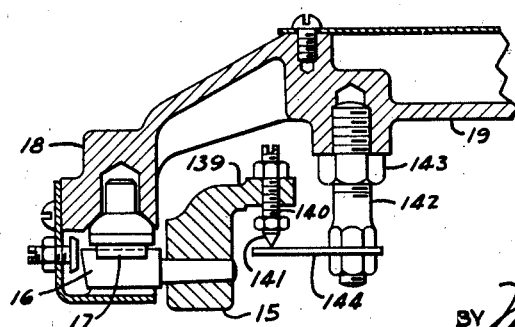
Fig. VI
Halvor W. Hem
INVENTOR
BY Marshall & Marshall
ATTORNEYS

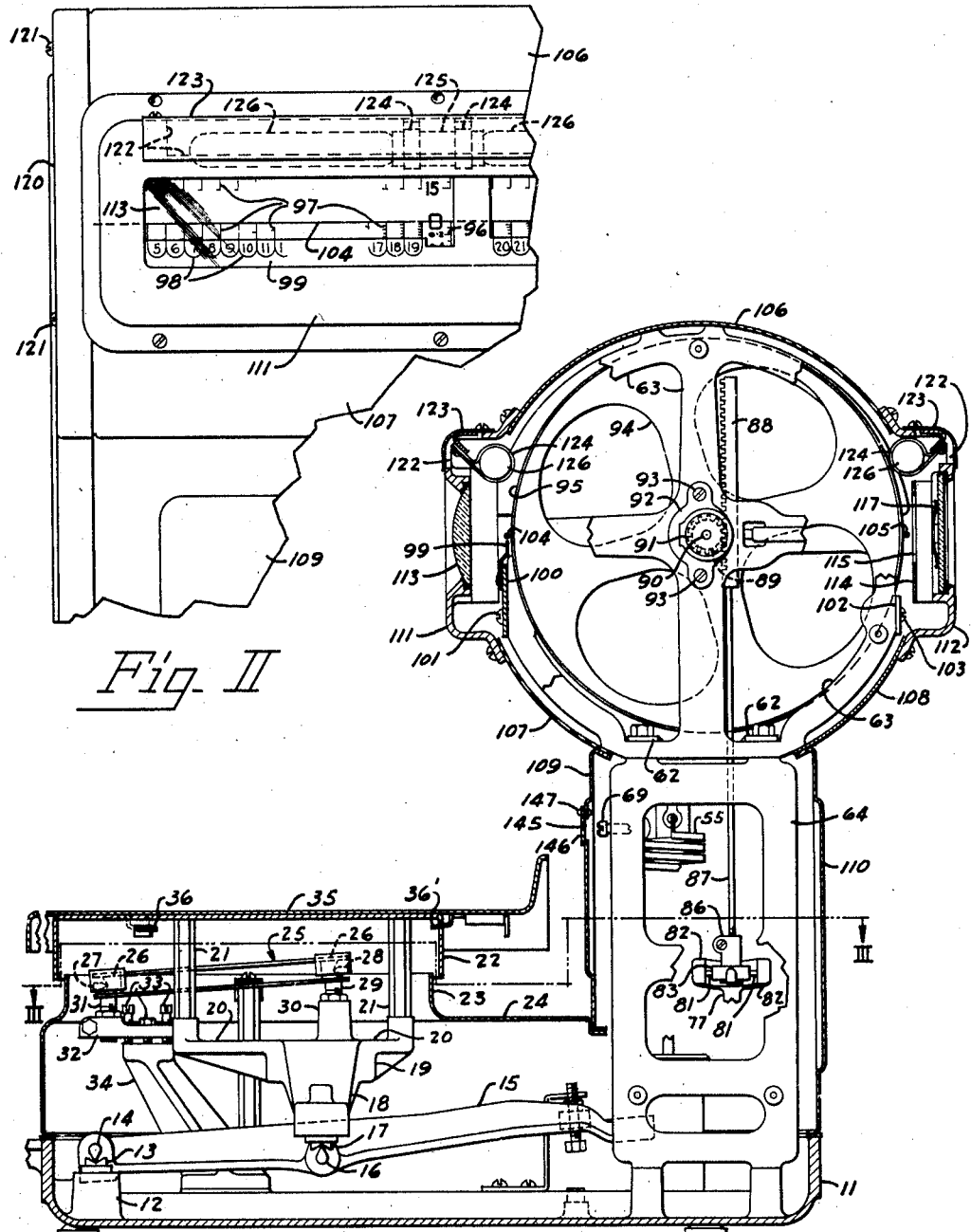

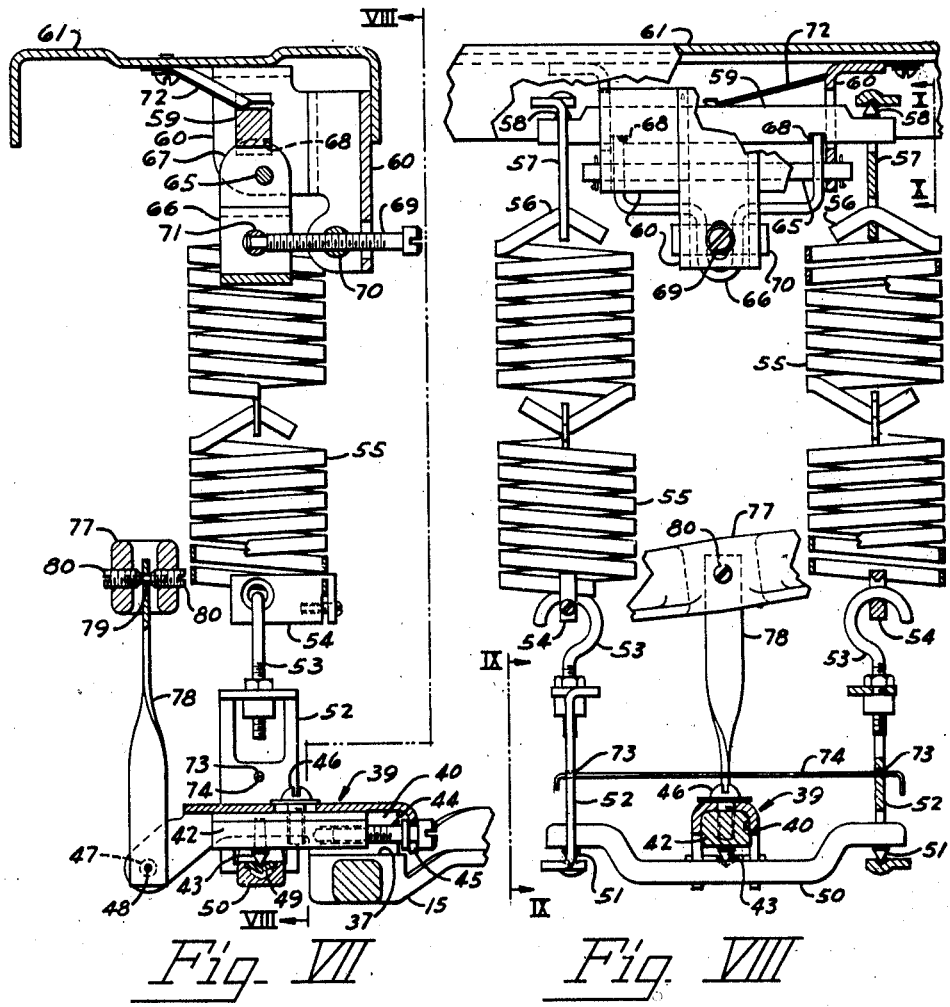
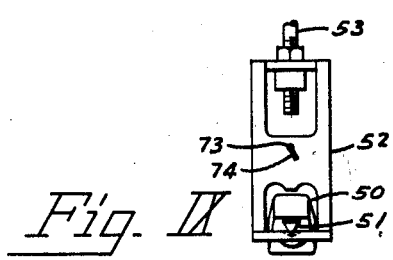
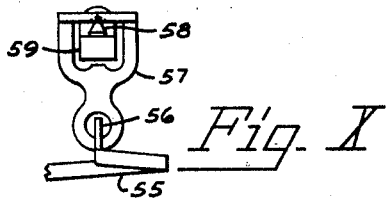

Patented Nov. 16, 1943

2,334,326

UNITED STATES PATENT OFFICE 2,334,326

WEIGHING SCALE

Halvor W. Hem, Toledo, Ohio, assignor to Toledo Scale Company, Toledo, Ohio, a corporation of New Jersey Application June 4, 1940, Serial No. 338,768

9 Claims. (Cl. 265—39)

This invention relates generally to weighing scales, and more particularly to weighing scales such as are used in retail shops and is an improvement which is applicable especially to scales of the type having a cylindrical indicating chart.

One of the principal objects of the invention is the provision of improved means whereby a load counterbalancing spring is only extended a relatively short distance for the complete chart movement.

Another object of the invention is the provision of improved means whereby a relatively small movement of the load supporting lever is translated by a second lever into a relatively large movement of an indicating chart actuating means.

Another object is the provision of a pair of load counterbalancing springs and improved means for adjustably suspending them.

Still another object is the provision of an improved equalizing connection between a load supporting lever and a pair of load counterbalancing springs; and, A still further object is the provision of an improved casing structure.

These, and other objects and advantages will be apparent from the following description in which reference is had to the accompanying drawings, illustrating preferred embodiments of the invention and in which similar reference numerals refer to similar parts throughout the several views.

In the drawings:

Fig. I is a side elevational view of a weighing scale embodying the invention, the casing being sectioned and portions of the load receiving platter and of other members being broken away.

Fig. II is a fragmentary front elevational view of the indicating casing.

Fig. III is a sectional plan view sectioned substantially along the line III—III of Fig. I and having portions of the base casing broken away for clarity.

Fig. IV is an enlarged fragmentary sectional front elevational view through the load supporting lever substantially along the line IV—IV of Fig. III.

Fig. V is a rear elevational view of the scale, portions being broken away and others shown in section.

Fig. VI is an enlarged fragmentary elevational view through the load supporting spider, the section being taken substantially along the line VI—VI of Fig. III.

Fig. VII is a side elevational view through a portion of the load counterbalancing means, substantially as seen from along the line VII—VII of Fig. V.

Fig. VIII is an enlarged fragmentary front elevational view as seen from along the line VIII—VIII of Fig. VII.

Fig. IX is an enlarged elevational view of one of the equalizer suspension stirrups as seen from along the line IX—IX of Fig. VIII; and Fig. X is a similar view of the upper suspension stirrup as seen from along the line X—X of Fig. VIII.

Referring to the drawings in detail:

This invention comprises in general a base 11 having a pair of upstanding bosses 12 adjacent one end thereof in which are mounted bearings 13 for the reception of fulcrum pivots 14 extending laterally from a load supporting lever 15. Fixed in the lever, in spaced relation to the fulcrum pivots 14, are load pivots 16 which support bearings 17 seated in downwardly turned arms 18 of a load platter supporting spider 19. Into extending arms 20 of this spider 19 are studded four vertical upwardly extending posts 21 upon which a circular pan-shaped member 22 is fastened in reversed position, thus telescoping an upwardly extending circular rim 23 of a base casing 24 which is secured to the upper edge of the wall of the base 11. The rim 23 defines a circular opening in the base casing through which the upwardly extending posts 21 project and in which is located a check link assembly 25. This check link assembly, by means of suitable bearings 26, engages a pair of opposed pivots 27 and 28 in the known manner. The pivots 28, which are machined on a flat plate-like member, are secured to a post 29 which is adjustably fixed in a boss 30 extending upwardly from the platter spider 19. The pivots 27 are fixed to the upper end of a post 31 adjustably threaded in a check link adjusting plate 32 which in turn is adjustably mounted, by means of a plurality of screws 33, on the upper face of a bracket 34 secured to the base 11.

The function of the check link assembly 25 is to maintain the condition of level of a load receiving platter 35, which, by means of clips 36 and a spring-urged latch 36', is securely positioned on the pan-shaped member 22.

For the purpose of coupling the lever 15 to the load counterbalancing and indicating means the lever 15 is provided with a pad 37 to which, by means of screws 38, a lever nose 39 is securely fastened (Figures III and VII). This lever nose is shaped to form a rectangular inverted channel 40 having laterally extending ears 41 through which the screws 38 pass. Within the channel 40 is slidingly mounted a pivot block 42 in which a downwardly directed cone pivot 43 is located.

A fillister head screw 44 (Fig. VII), threaded into the end of the block 42, has a circular groove machined in its head and this groove is engaged by walls formed by a slot 45 cut in the end of the lever nose thus permitting the screw 44 to be rotated and by this rotation move the block 42 to adjust the position of the pivot. A screw 46, extending through a longitudinally extending slot in this lever nose and threaded in the block 42, is adapted to lock this block in adjusted position. Forwardly extending portions of the downwardly extending side walls of the channel member 40 are provided with apertures through each of which is threaded a small screw 47. The ends of these screws are drilled axially and supported in the drilled holes and extending between the two screws is a small hardened steel pin 48; whose function will later become clear.

The cone pivot 43 engages a hardened steel bearing 49 which is staked into a countersunk hole in an equalizer 50. Each of the free ends of this equalizer is provided with a downwardly directed cone pivot 51 which engages one of a pair of stirrups 52. These stirrups are equipped with adjustable hooks 53 which engage apertures in calibrator connections 54 clamped to the last coil of load counterbalancing springs 55, the upper ends of which are provided with V-shaped suspension arms 56 engaging stirrups 57 suspended from upwardly directed cone pivots 58 in a rectangular spring suspension bar 59. This spring suspension bar projects through suitable apertures in the sides of a bracket 60 spotwelded or otherwise fastened to a channel-shaped tie plate 61, the ends of which, by means of ears 62, rest upon and are bolted to chart casing spiders 63 surmounting casing frames 64 and 64' which are erected on one end of the base 11 in spaced relation to each other (Figures I and V).

A pin 65, which extends through apertures in the sides of the bracket 60, serves as a fulcrum for a stamped and formed substantially U-shaped member 66. Since the pin 65 in the bracket 60 is offset from the vertical axis of the aperture in which the spring suspension bar is seated, rounded ends 67 of the U-shaped member 66 which enter suitably milled grooves 68 in this suspension bar are adapted to raise and lower this bar when a screw 69 is turned. The screw 69 is threaded through a trunnion-like member 70 extending through a suitably formed portion of the bracket 60, and is provided with a tenon which is loosely riveted in a somewhat similar trunnion-like member 71 rockably seated in a suitably formed portion of the member 66.

To prevent the bar 59 from accidentally disengaging from its seat on the rounded ends 67 of the bracket 66 a formed cantilever spring 72 is provided whose free end presses against the bar 59 and whose other end is bolted to the underside of the tie plate 61.

To prevent the stirrups 52 and 57, as well as the springs 55 which engage these stirrups, from twisting about their longitudinal axis and thus interfering with the free working of the scale, a thin stiff wire member 74 is provided which passes through drilled holes 73 in the stirrups 52 to limit the extent of any possible rotation.

Since the magnitude of errors, due to certain spring characteristics, increase when a spring has a comparatively long extension increment for each increment of weight and conversely diminish when the spring has a comparatively short extension for the same increment, the present invention contemplates the use of a spring having a very short extension for the full load and means to multiply this short movement to actuate the indicating means. To accomplish this, the casing frame 64' (Figures III and V) is provided with ball bearings 75, seated in suitably positioned apertures. These ball bearings form fulcrums for the tenoned ends of a shaft 76 extending across the bifurcated end of an indicating means actuating lever 77. This lever is coupled to the lever nose by means of a single twisted link 78 (Figures VII and VIII), the lower end of which, by means of a suitable aperture, engages the previously mentioned pin 48, the upper end of which engages a similar pin 79 extending between two axially drilled holes in the ends of screws 80 threaded through the spaced walls of a bifurcated portion of the lever 77.

The free end of the lever 77 terminates in a fork, formed by arms 82 (Figures III and I), and upon pins 81, which project laterally inwards from each of the arms 82, is pivotally mounted a gimbal ring 83. A pin 84, which extends across the gimbal ring 83 at right angles to the pins 81, pivotally supports a clamp 86 in which the lower end of a rod 87 is adjustably held. This rod carries on its upper end a rack 88 whose teeth mesh with the teeth of a pinion 89 (Figures I and V). This pinion is keyed to a shaft 90 having a hardened and ground tenon at each end with which it is mounted in antifriction ball bearings 91 located in brackets 92 which are fastened, by means of screws 93, to the chart casing spiders 63 which surmount the casing frames 64 and 64'. Also mounted on the shaft 90 and keyed thereto are a plurality of chart spiders 94 which are enveloped by a cylindrical chart 95 constructed from thin aluminum. This chart 95 bears a series 96 of weight indicia and a plurality of series 97 of computed values and serves the usual purpose.

Cooperating with the chart 95 is a series 98 of unit prices printed upon a price indicator 99 secured to a tie plate 100 whose ends are fixed by means of screws 101 to the casing spiders 63. A similar, although somewhat narrower, tie plate 102 is fastened by means of screws 103 to these casing spiders on the rear of the scale.

To enable the operator to read the proper weight and value indicia an indicating line 104 is stretched in front of the chart immediately adjacent the surface of the chart 95. A similar line 105 is stretched across the rear of the scale so that the customer may observe the proper weight indicium.

The chart is housed in a casing comprising an upper casing plate 106 which is curved to fit the periphery of the casing spiders 63 and lower front and rear casing plates 107 and 108. The lower edges of the latter rest freely upon flanges of front housing plate 109 and rear housing plate 110. Secured to the appropriate edges of the plates 106 and 107 on the front of the casing is an indicator frame 111 and a similar frame 112 is secured to the appropriate edges of the plate 106 and the plate 108 on the rear of the casing. In a fenestration in the indicator frame 111 is mounted a cylindrical magnifying lens 113 which serves the usual purpose in exposing the indicia bearing surface. Secured to the indicator frame 112 on the rear of the housing is a formed plate 114 having an opening 115 which overlies a series 116 of weight indicia. This series extends in the direction opposite to the series 96 so that they may be read by the customer. Suitable inscriptions may be printed or otherwise marked on the plate 114. These are exposed to view to the customer through an opening in the rear indicator frame 112 which, for the purpose of preventing the entrance of dust and moisture, is covered by a pane of transparent glass 117.

It will be observed that the plates 106, 107 and 108 and the frames 111 and 112, as well as the front and back housing plates 109 and 110 respectively, are not screwed or otherwise fastened to the casing spiders 63 nor to the casing frames 64 and 64'. The reason for this is the fact that the accuracy of weighing scales depends in a large measure upon the accurate alignment and invariability of its component parts. According to the present invention these casing parts are held in position by marginal flanges 118 of the end casing plates 119 and 120 and these end casing plates are secured to the casing spiders 63 and the casing frames 64 and 64', by means of screws 121, in such a manner that no strains are set up which have a tendency to influence the relative position of the ball bearings 91 in which the chart is fulcrumed. Any shifting of these bearings after they have been once properly aligned, such as is commonly the fact when the casing members are screwed to the end frames, results in indicating errors.

The indicating frames 111 and 112 are each provided with an opening 122 which is covered by formed plates 123 to which brackets 124 are suitably fastened. These brackets carry electric light sockets 125 for the reception of electric lamps 126 by means of which the indicating chart is brilliantly illuminated. A switch 148 (Fig. V) secured to a bracket 148' dependingly secured to the tie plate 61 is adapted to be actuated by a pin 149 made from dielectric material and studded in the upper end of an upwardly extending arm 150 of the lever 77 to cause a contact to energize the lamps whenever the scale is placed in operation or a manipulative switch can be inserted in the circuit to selectively energize the lamps. Since the lamp sockets are secured to the covers 123 these lamps may be replaced very conveniently by removing the covers 123 without disassembling any other casing parts.

Since in scales of this type the load receiving platter is generally of relatively large size and when a heavy load is placed carelessly near the edge of the platter there may be a tendency to tip the lever out of its bearings, therefore means are provided to prevent such displacement as well as a tipping of the load supporting spider pivots from their bearings. For this purpose the lever 15 is provided in the turning axis of its fulcrum pivots, with inwardly extending horizontal flanges 127 which have vertically drilled holes into which a tenon 128 of a flat top bearing 129 is threaded. This bearing is adjusted so that its flat surface is exactly in the horizontal plane of the edges of the pivots 14.

For cooperation with these bearings 129 the base 11 has upwardly directed bosses 130 to which a pivot retainer plate 131 is fastened by means of screws 132. Each overhanging end of this plate is provided with two holes, through the outer one is threaded a screw 133 having a hardened and ground conical point 134 which is adjusted so that the point lightly presses against the bearing 129 and then is locked by means of a lock nut 136. The overhanging portion of the pivot retainer plate has some resiliency and thus any upward movement of the bearing 129, due to a large load carelessly placed on the edge of the platter, is resiliently resisted. Means however are also provided to increase and regulate the amount of resilient pressure with which to resist such a movement. For this purpose a screw 135, which passes freely through the other hole in the pivot retainer plate 131 and is threaded into a laterally projecting portion of the boss 130, also passes through a helical compression spring 137 positioned between a washer 138 underneath its head and the plate 131 so that by turning the screw 135 more or less pressure may be exerted on the spring 137. It will be seen that any tendency of the fulcrum pivot 14 to disengage from its bearing 13 is thus effectively prevented without causing inaccurate indications.

To prevent the load supporting spider from disengaging from its pivots 16 flanges 139 (Fig. VI) of the lever 15, located so as to be bisected by a plane passing vertically through these load pivots 16, are threaded and screws 140 having conical hardened and ground points 141 pass vertically therethrough. These screws are adjusted so that the points 141 lie in the turning axis of the spider 19. A shouldered stud 142, locked in the spider 19 by lock nuts 143 and positioned adjacent each screw 140 and in the same vertical plane, has locked against its shoulder a plate 144 which is adapted to engage the points 141.

To dampen the vibrations of the scale so that the chart will come to rest after only one or two oscillations a laterally extending arm 151 is fixed in the arm 150 of the lever 77. This arm is pivotally connected as at 152 to the upper end of a plunger rod 153 of a dashpot 154 which performs its usual function.

The operation of the scale is as follows: When a load is placed on the platform 35, due to the action of gravity, the lever 15 rocks about its fulcrum 14 and through the nose pivot 43 the torque is transmitted through the equalizer 50, the stirrups 52 to the counterbalancing springs 55. These stretch in the usual manner and by so doing counterbalance the load. As hereinbefore mentioned, the present invention has for an object a combination of means for reducing the magnitude of errors usually encountered in weighing springs. It is well known that stability and accuracy are enhanced and hysteresis diminished by having a chart pinion of considerable diameter. In the usual spring scale design, since the rack is usually attached to that member which also transmits the pull to the springs, the springs are extended the same amount that the rack is reciprocated, this is a comparatively long distance, and therefore the spring errors due to this extension are considerable. Owing to the embodiment of the present invention however the extension of the spring is only a fraction of the rack travel.

As the lever 15 rocks about its fulcrum the link 78, which pivotally engages the lever nose through the pin 48, also pivotally engages the lever 77 through the pin 79 and since this lever is of the second order it may be designed so as to multiply the movement of the lever nose in any desired, reasonable ratio, thus permitting the use of a chart pinion of relatively large diameter with a relatively short spring extension.

The hereinbefore described means for connecting the nose of the lever 15 to the lever 11 presents a ready adjusting means. In the construction of scales it is an elementary rule that all connections between the different movable scale parts must remain in a position which is as nearly vertical as possible. This condition in the great majority of scale constructions is not realized to the optimum extent since scale levers and other movable scale parts usually have arcuate movement about a fulcrum. In the present invention by loosening one of the screws 47 in the lever nose and tightening the other the exposed portion of the pin 48 which engages the link 78 may be shifted from side to side. By repeating the operation with the screws 80 in the lever 77 the upper end of the link 78 may be aligned so that when the levers rock about their fulcrums which are at right angles to each other the link 78 may be positioned so that it remains in its optimum condition during the arcuate movement of the levers.

The position of the upper ends of the springs is very readily adjusted by turning the screw 69 which is accessible through an opening 145 in the front housing plate 109 which is covered by a small flap 146 pivoted as at 147. When the screw 69 is turned by the insertion of a screw driver into its slot, the cooperation of its threads and the threads in the trunnion member 70 rocks the member 66 about its fulcrum on the pin 65 and the rounded ends of this member, which form a cam since it is eccentrically fulcrumed, raise the suspension bar 59. The link 78 being of the "push and pull" type, a change in the position of the spring suspension changes the position of the lever 77 and the rack pivoted thereon. The chart may thus be readily brought into a position in which the initial graduation in the series 96 is in direct registration with the lining wire 104. Since this adjustment changes the position of the spring bodily no change is made in its counterbalancing capacity. Any suitable means may be employed for locking the parts after making the hereinbefore described adjustments.

Although the invention is applicable to scales employing springs made from any material having the necessary resilient properties it is contemplated to employ springs made from material which is substantially unaffected by changes in temperature and which are only slightly subject to hysteresis. It must be understood that the invention herein shown and described is susceptible to variation, modification and change within the spirit and scope of the subjoined claims.

Having described my invention, I claim:

1. In a device of the class described, in combination, a base, a casing erected upon the rear of said base and coextensive therewith, said casing including a pair of spaced frames and a tie plate secured to and extending between said spaced frames, a bracket having spaced walls secured to said tie plate and having rectangular apertures in two of its spaced walls, a substantially rectangular bar mounted within and having portions extending through said rectangular apertures, conically pointed pivots in said extending portions, a cam-like member pivoted on said bracket and engaging said rectangular bar, load supporting means mounted for oscillative movement on said base, an equalizer pivotally engaging said load supporting means and a pair of conical pivots in said equalizer, a pair of helical extensible springs, a stirrup pivotally engaging the upper end of each of said springs for suspendingly mounting said springs upon said conical pivots in said rectangular bar, a stirrup pivotally engaging the lower end of each of said springs and engaging said conical pivots in said equalizer and a screw threaded in said bracket and engaging said cam-like member for raising and lowering said rectangular bar in said rectangular apertures of said bracket whereby said helical extensible springs and that portion of the load supporting means are bodily raised without exerting influence on the load counterbalancing capacity of said springs.

2. In a device according to claim 1, a cantilever spring having one of its ends rigidly secured to said tie plate and the other end engaging said rectangular bar for constantly urging said rectangular bar towards the bottom of said rectangular apertures.

3. In a weighing scale, in combination, a base, a frame mounted upon said base, a load supporting lever mounted upon said base, a pair of load counterbalancing springs, means for suspendingly supporting said springs, an operative connection between said load supporting lever and said springs, said means for suspendingly supporting said springs comprising an apertured bracket secured to said frame, a bar extending through such apertures in said bracket, and having spaced grooves therein, a substantially U-shaped bracket eccentrically pivoted on said first mentioned bracket and having rounded ends for entrance into such grooves in said bar, a trunnion member in each of said brackets and a screw threaded through one of said trunnions and revolubly retained in the other of said trunnions for raising or lowering said bar.

4. In a device of the class described, in combination, a frame, load supporting means, load counterbalancing mechanism and load indicating means supported upon said frame in cooperative relation to each other, said load counterbalancing mechanism including a pair of spaced helical weighing springs, an upwardly directed conical pivot for each of said helical weighing springs, stirrups engaging said upwardly directed conical pivots and having supporting engagement with the upper ends of said weighing springs, said load supporting means having a conical pivot, an equalizing member having a bearing engaging said conical pivot in said load supporting means, stirrups having drilled holes suspended from the lower ends of said weighing springs, said equalizing member having spaced conical pivots for engaging said stirrups, and means for preventing substantial rotation of said weighing springs about their points of rotation on said conical pivots, said means for preventing such substantial rotation of said weighing springs comprising a thin relatively stiff metallic member extending through such drilled holes in said stirrups suspended from the lower ends of said weighing springs.

5. In a device of the class described, in combination, a frame, load supporting means, load counterbalancing mechanism and load indicating means supported upon said frame, said load counterbalancing mechanism including a pair of spaced helical weighing springs, an upwardly directed conical pivot for each of said helical weighing springs, stirrups engaging said upwardly directed conical pivots and pivotally engaging the upper ends of said weighing springs, said load supporting means having a conical pivot, an equalizing member engaging said conical pivot in said load supporting means and having spaced conical pivots for engaging stirrups pivotally suspended from the lower ends of said weighing springs and means for preventing substantial rotation of said weighing springs about their points of suspension on said conical pivots.

6. In a weighing scale, in combination, a frame, a load supporting lever fulcrumed upon said frame, a load counterbalancing spring suspended from said frame, rotatable indicating means, a motion multiplying lever fulcrumed on said frame, an operative connection between said load supporting lever and said load counterbalancing spring, an operative connection between said load supporting lever and said motion multiplying lever, means including a rack and pinion between said motion multiplying lever and said indicating means, said operative connection between said load supporting lever and said motion multiplying lever comprising a "push and pull" link having its lower end pivotally connected to said load supporting lever and its upper end pivotally engaging said motion multiplying lever and adjusting means for independently shifting the point of pivotal engagement of each end of said "push and pull" link transversely to the longitudinal axis of that lever which the end pivotally engages, one of said adjusting means comprising two opposed longitudinally spaced adjustable screws and a hardened pivot entering longitudinal extending apertures in said spaced screws and extending therebetween.

7. In a weighing scale, in combination, a frame, a load supporting lever fulcrumed upon said frame, a load counterbalancing spring suspended from said frame, rotatable indicating means, a motion multiplying lever fulcrumed on said frame, an operative connection between said load supporting lever and said load counterbalancing spring, an operative connection between said load supporting lever and said motion multiplying lever, means including a rack and pinion between said motion multiplying lever and said indicating means, said operative connection between said load supporting lever and said motion multiplying lever comprising a "push and pull" link having its lower end pivotally connected to said load supporting lever and its upper end pivotally engaging said motion multiplying lever and means for independently shifting the point of pivotal engagement of each end of said "push and pull" link transversely to the longitudinal axis of that lever which the end pivotally engages.

8. In a weighing scale, in combination, a base, a single commodity receiver supporting lever of the second order fulcrumed at one end upon said base, load counterbalancing springs suspended from the base and connected to the nose end of said load supporting lever, a motion multiplying lever extending transversely to said commodity receiver supporting lever and also connected to the nose end of said commodity receiver supporting lever, a rotatable cylindrical computing chart overlying said motion multiplying lever and extending longitudinally thereof, a pinion fixed to said rotatable cylindrical chart, and a rack pivotally connected to the nose end of said motion multiplying lever and meshing with said pinion.

9. In a weighing scale, in combination, a base, a commodity receiver supporting lever fulcrumed at one end upon said base, a pair of load counterbalancing springs suspended from the base, an equalizer pivotally engaging the nose end of said commodity receiver supporting lever and the lower ends of said pair of springs, a motion transmitting lever extending transversely to said commodity receiver supporting lever and also connected to the nose end of said commodity receiver supporting lever, a rotatable cylindrical weight indicating chart overlying said motion transmitting lever and extending longitudinally thereof, a pinion fixed to said rotatable cylindrical chart, a universal mounting pivotally connected to the nose end of said motion transmitting lever and a rack secured to said universal mounting and meshing with said pinion.

HALVOR W. HEM.